United States Patent [19]

Hunt

[11] 3,914,551

[45] Oct. 21, 1975

[54] TELEPHONE ANSWERING DEVICE WITH PROGRAMMED ELECTRONIC SEQUENCE CONTROL

[75] Inventor: Theodore R. Hunt, Aloha, Oreg.

[73] Assignee: Data Time, Inc., Portland, Oreg.

[22] Filed: Apr. 3, 1974

[21] Appl. No.: 457,585

[52] U.S. Cl. .............................................. 179/6 R

[51] Int. Cl.[2] .............................................. H04N 1/64

[58] Field of Search ................... 179/6 R, 6 E, 6 AC

[56] References Cited

UNITED STATES PATENTS

| | | | |
|---|---|---|---|
| 3,728,489 | 4/1973 | Beacham | 179/6 R |
| 3,798,382 | 3/1974 | Hoven | 179/6 R |
| 3,825,687 | 7/1974 | Waldman | 179/6 E |
| 3,838,219 | 9/1974 | Mason | 179/6 AC |

*Primary Examiner*—Bernard Konick
*Assistant Examiner*—Stewart Levy
*Attorney, Agent, or Firm*—Kolisch, Hartwell, Dickinson & Stuart

[57] ABSTRACT

A plural-mode telephone answering device in which, at any given time, and in any selected operating mode, the operating conditions of recording, playback, and line-coupling and interface apparatus in the device are controlled by the instantaneous voltage states existing on outputs of a programmed electronic, read-only memory. Determining what will be such output voltage states are two types of input information provided the memory. One of these types comprises a pattern of voltage states supplied by a mode selector in the device to indicate the selected mode of operation. The other type comprises another pattern of voltage states supplied by staging circuitry in the device, which circuitry at all times monitors the then-existing operating statuses of the recording, playback, and line-coupling and interface apparatus, and by such monitoring indicates the particular stage of operation required in the selected mode.

4 Claims, 10 Drawing Figures

TELEPHONE ANSWERING DEVICE WITH PROGRAMMED ELECTRONIC SEQUENCE CONTROL

BACKGROUND AND SUMMARY OF THE INVENTION

This invention pertains to a telephone answering device, and more particularly to such a device which has a plurality of operating modes, and wherein the operations of the various components in the device, in the different operating modes, are under the control of a preprogrammed electronic memory.

The usual telephone answering device is a piece of equipment which may be connected to a telephone line, at the location of a subscriber's telephone set, for the purpose of responding to incoming calls at times when the subscriber is absent. Such a device usually for the further purpose, when desired by the subscriber, of allowing a calling party to record a message which may later be heard by the subscriber. The typical telephone answering device includes a pair of recording media, usually magnetic tapes, on one of which a subscriber may record (and change at will) an announcement which he wishes to have played out to a calling party, and on the other of which a calling party may record a message of his own, after hearing the announcement.

To facilitate such operations, an answering device will usually have several different operating modes in which it can be placed at the selection of the subscriber. Typical modes are as follows:

Announcement Record—a mode permitting recording of an announcement.

Announcement Check—a mode permitting local playing out of an announcement for checking purposes.

Answer Only—a mode in which the answering device automatically answers an incoming telephone call, and then simply plays out the recorded announcement.

Answer/Record—a mode similar to the Answer Only mode, but which after playing out an announcement permits the calling party to record a message.

Playback—a mode permitting the subscriber (locally) to play out recorded messages.

Erase—a mode permitting erasure of recorded messages.

With the exception, usually, of modes such as the above-described Playback and Erase modes, the other modes normally comprise a plurality of sequential stages. In prior art telephone answering devices, the means typically used to determine the particular operating stage required at any given time has taken the form of relatively complex relay circuitry, with interconnected relay-operated switches and contacts. One of the drawbacks of such construction is that it is bulky, and requires a considerable amount of housing space. Another drawback is that such circuitry uses a considerable amount of electrical power. Still another deficiency of prior art relay circuitry is that it eventually introduces serious reliability and maintenance problems, since moving wear parts are involved. Also, it is normally the case that relay circuitry is committed to operation in a predetermined sequence of steps, which must be completed regardless of whether actual operating conditions require completion of the steps. For example, in an Answer/Record mode in a prior art telephone answering device using relay circuitry, the relay circuitry would often not be capable of recognizing instantaneously that a calling party, after hearing an announcement, decides not to record a message, and hangs up. In other words, it would not be capable of placing the answering device instantaneously in a condition to receive a next incoming call, but rather, would first have to trace through certain sequential steps so as to return the device to a waiting condition.

A general object of the present invention is to provide an answering device which is capable of performing all of the functions and typical operating modes outlined above, but which avoids, in a very practical and satisfactory manner, the difficulties encountered with relay-type control circuitry.

According to a preferred embodiment of the invention, the proposed answering device incorporates unique, totally electronic control circuitry which controls all operations of all components, throughout the operating modes performable by the devide. At the heart of this circuitry is a preprogrammed electronic memory, known as a "read-only" memory, which directly effects the performances of such components. The memory operates in response to other circuitry which continually informs it both with respect to the nature of the selected mode of operation, and with respect to the operating stage within that mode in which the device at any given instant of time should be operating. The circuitry feeding information to the memory performs in such a way, according to the invention, that it not only, under proper circumstances, progressively sequentially advances the operation of the device through the successive stages of a mode, but also, when circumstances dictate (as by a calling party prematurely hanging up), effects immediate resetting of components to a condition waiting to perform the mode again, without having to await the completion of subsequent sequential steps in the mode.

In its most basic form, the device of the invention may be viewed as having three main constituents: (1) a mode selector actuable to select the operating mode of the device, and constructed to produce (when so actuated) an electrical signal condition which specifically indicates the selected mode; (2) electronic staging means, or circuitry, coupled to the operative components in the device (such as the recording means, playback means, and various line-coupling and interface means) for sensing the respective instantaneous statuses of these components, and for producing from such sensing another electrical signal condition which indicates the sensed statuses; and (3), a preprogrammed electronic memory which is operatively connected to the mode selector, to the staging circuitry, and to the operative components in the device, and which is instantaneously responsive to the combination of the two electrical signal conditions mentioned to effect automatically the then-required respective operations of the various operative components.

Other features and advantages offered by the invention will become more fully apparent as the description which follows is read in conjunction with the accompanying drawings.

Figure 6:
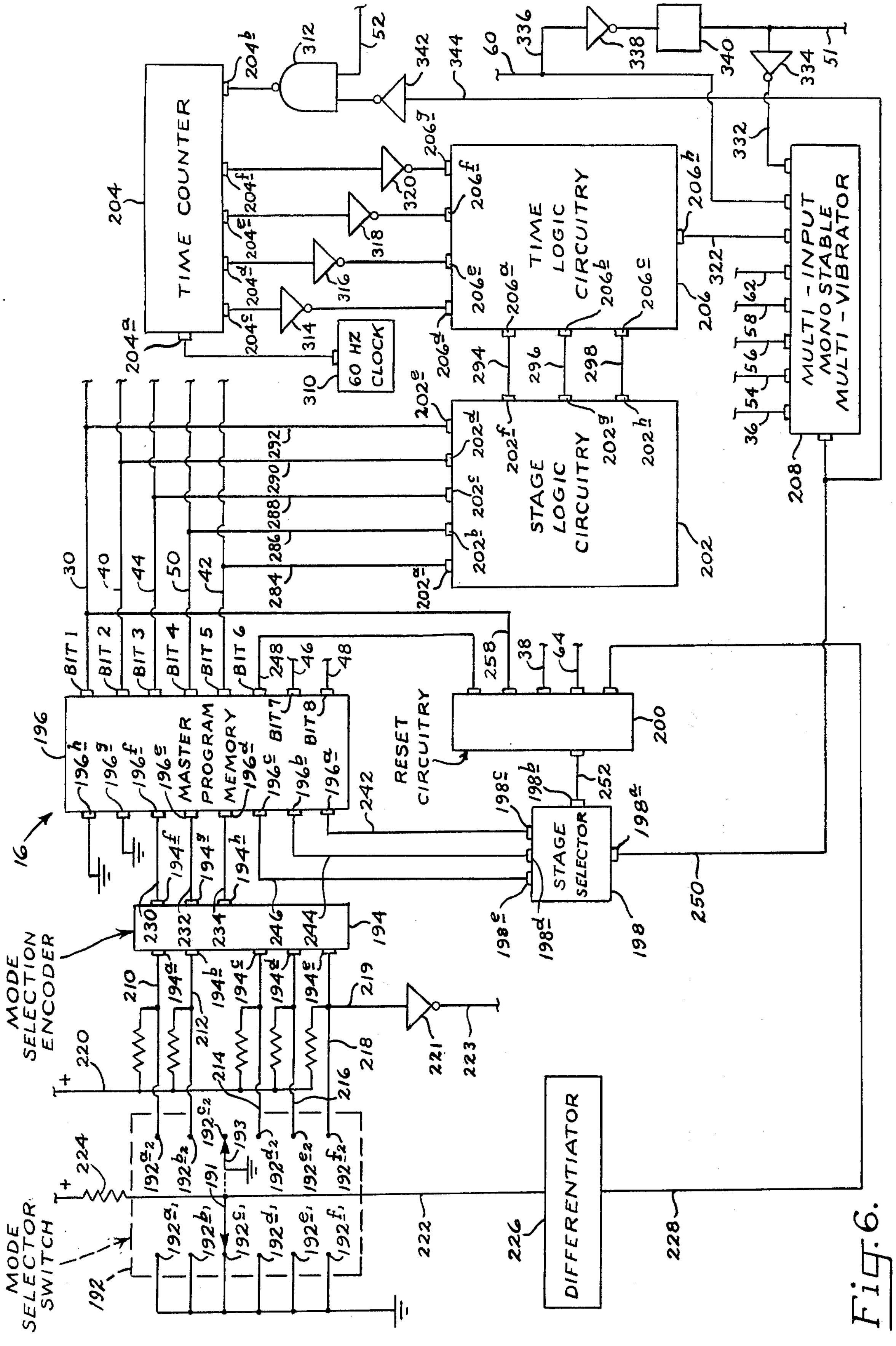
FIG. 6 is a block diagram illustrating the details of what is contained within the block in FIG. 1 labeled "Programmed Electronic Sequence Control Circuitry."
Figure 10:
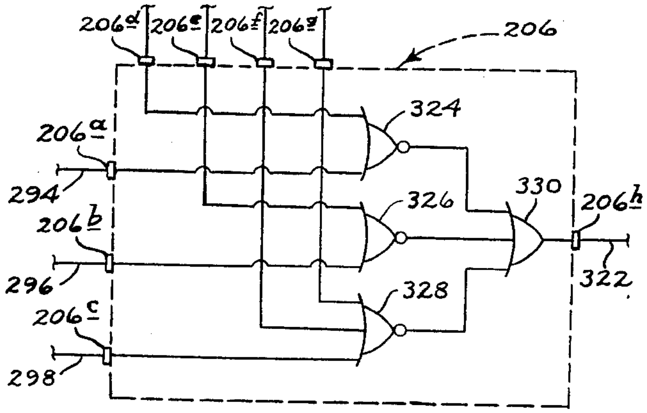

And, FIG. 10 illustrates details of the block in FIG. 6 labeled "Time Logic Circuitry."

DETAILED DESCRIPTION OF THE INVENTION

1. Explanation of Terminology

Explaining briefly certain terminology which appears herein, various components shown in the drawings operate in response to a pair of voltage levels. More specifically, one of these levels corresponds to a certain positive voltage (e.g., a voltage above ground) which will be referred to hereinafter as a 1 state. The other level corresponds essentially to ground, and will be called hereinafter a 0 state. A terminal or a conductor having one of these voltage levels on it will be referred to as being in, or as having on its, either a 1 or a 0 state.

2. Description of Logic Gates Used

Among the components illustrated in the drawings which respond to the voltage levels just mentioned are certain logic gates. In particular, three different types of gates, all conventional in construction, are employed. These comprise NAND, NOR and OR gates.

In a NAND gate: with a 0 state on any input, the output is held in a 1 state; with all inputs in 1 states, the output is placed in a 0 state.

A NOR gate functions whereby: if any input is in a 1 state, the output is held in the 0 state, if all inputs are placed in 0 states, then the output is placed in a 1 state.

In an OR gate: if any input is in a 1 state, the output of the gate is held also in a 1 state; if all inputs are in 0 states, then the output is also in a 0 state.

The operations of other components shown in the drawings which respond to, or generate, these two voltage levels will be explained as such components are encountered below.

3. The Answering Device Generally

Figure 1:
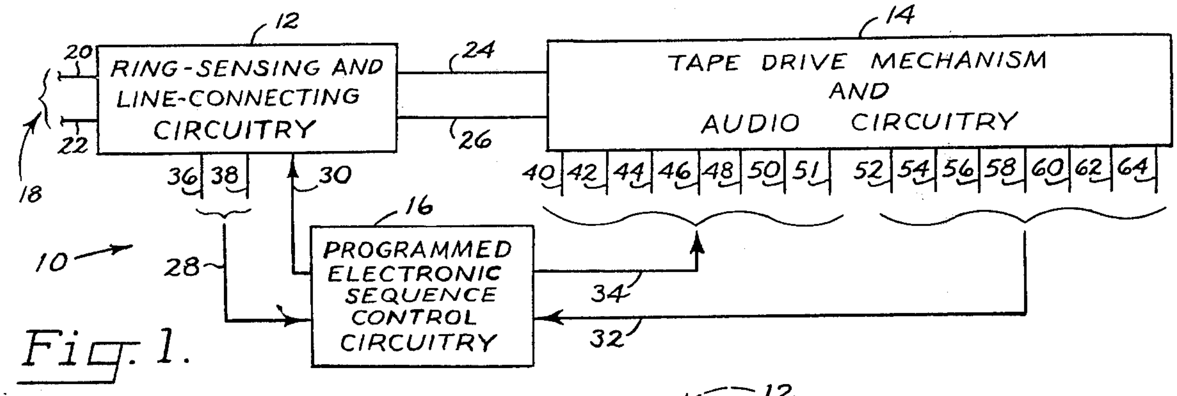
FIG. 1 is a simplified block diagram illustrating generally the overall arrangement of the answering device of the invention.

Turning now to the drawings, and referring first to FIG. 1, indicated generally at 10, in block form, is a telephone answering device constructed in accordance with the present invention. As depicted in FIG. 1, device 10 is shown as including ring-sensing and line-connecting circuitry, represented by a block 12, tape drive mechanism and audio circuitry, represented by a block 14, and programmed electronic sequence control circuitry, represented by a block 16. The various elements which have been referred to above as "operative components" in the answering device are contained within blocks 12, 14, and include, among other things, the various means through which device 10 couples to a telephone line, as well as the means through which announcements and messages, such as those discussed earlier, are recorded and played out. Other apparatus, which also forms part of the "operative components"

of the answering device will be readily identifiable as the contents of blocks 12, 14 are later described. Generally speaking, what is contained within block 16 is what was described earlier as unique electronic control circuitry for controlling the different respective operations of the operative components contained within blocks 12, 14.

Indicated by the bracket shown at 18 is a conventional telephone line, including the usual pair of conductors 20, 22. Conductors 20, 22 are connected in a conventional manner to a subscriber's telephone set (not shown), and also to the ring sensing and line connecting circuitry within block 12. As will be more fully explained, apparatus in block 12 responds to ringing voltage between conductors 20, 22 (which voltage indicates the presence of an incoming call) to "answer" the call, and to establish a conductive connection with the telephone line, which connection is maintained so long as the calling party remains "on the line." Such a conductive connection establishes a connection between conductors 20, 22 and conductors 24, 26, respectively, which are shown interconnecting blocks 12, 14.

Details of the contents of block 14 will be described later, but generally speaking, this block includes recording media for recording and playing out announcements and messages, drive mechanism for driving the recording media, and various equipment for coupling to conductors 24, 26 so as to receive therefrom, and to transmit thereto, audio electrical signals.

Still considering the general arrangement of device 10, circuitry within block 16 is connected to equipment in block 12 through cables 28, 30, and to equipment in block 14 through cables 32, 34. Cable 28 contains a pair of conductors, 36, 38, which, generally speaking, supply information from block 12 to block 16. Thus, an arrowhead is provided on cable 28 which points toward block 16 to indicate such an information flow. Cable 30 is a single-conductor cable that supplies information in the reverse direction, as indicated by the arrowhead on this cable. With respect to the connections between blocks 14, 16, cable 34 contains seven conductors, 40, 42, 44, 46 48, 50, 51, with this cable and its conductors supplying information from block 16 to block 14. Cable 32 supplies information in the reverse direction, and also includes seven conductors, shown at 52, 54, 56, 58, 60, 62, 64.

Answering device 10 is selectively placeable, as will be explained, in each of the six operating modes mentioned above. Thus, it is placeable in an Announcement Record mode, an Announcement Check mode, an Answer Only mode, an Answer/Record mode, a Playback mode, and an Erase mode. Each of the first four of these modes is a multiple-stage mode—the remaining two comprising but single-stage modes. The selection of the particular operating mode desired for the device is made manually by the owner of device 10. After such selection, and in most of the modes, operation of the components in the device are then under the complete control of the electronic circuitry within block 16. Details of the operations performed during the different modes will be discussed later.

4. The Ring-Sensing and Line-Connecting Circuitry—Block 12

Figure 2:
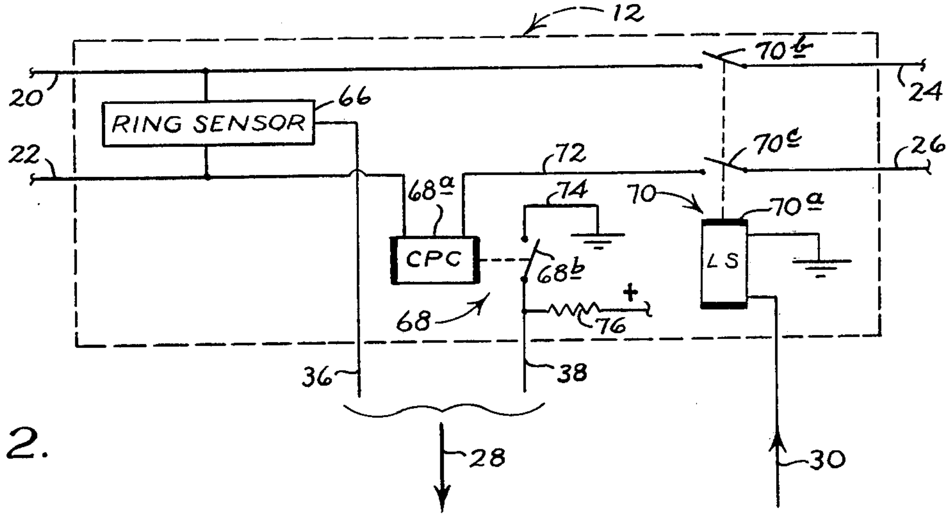
FIG. 2 is a circuit diagram, partly in block form, illustrating details of the block in FIG. 1 labeled "Ring-Sensing and Line-Connecting Circuitry."

Turning to FIG. 2, this illustrates details of the circuitry contained within block 12 in FIG. 1. Included within this circuitry is a conventional telephone ringing current sensor, shown in block form at 66, and labeled "Ring Sensor," and a pair of relays 68, 70. Relay 68 includes a coil 68*a* and a normally open switch 68*b*. This relay is a conventional "Calling Party Control" relay, and its coil in FIG. 2 is thus designated CPC for identification purposes. Relay 70 is a conventional "Line Seizure" relay, including a coil 70*a* marked LS, and a pair of normally open switches 70*b*, 70*c*.

Ring sensor 66 has two inputs, shown directly connected to telephone line conductors 20, 22. In addition, it includes an output connected to conductor 36. In the absence of ringing voltage between conductors 20, 22, the output of the ring sensor, and hence conductor 36, is in a 0 state. On ringing voltage appearing between conductors 20, 22, the ring sensor immediately applies a 1 state to conductor 36, which 1 state remains so long as ringing voltage continues. As was mentioned earlier, the ring sensor is entirely conventional in construction, and hence no details thereof are shown or described herein.

Conductor 20, in addition to being connected to an input of ring sensor 66, is also connected to one side of switch 70*b*, the other side of which is connected to conductor 24. Conductor 22, in addition to being connected to the other input of the ring sensor is also connected to one side of coil 68*a*, the other side of which is connected through a conductor 72 to one side of switch 70*c*. Conductor 26 connects with the other side of switch 70*c*.

The upper side of switch 68*b* in FIG. 2 is grounded through a conductor 74. The lower side of this switch is connected both to conductor 38, and through conductor 38 and a resistor 76 to a suitable source of positive voltage. With switch 68*b* open as shown in FIG. 2, positive voltage applied through resistor 76 places conductor 38 normally in a 1 state. Closure of switch 68*b* grounds conductor 38, and hence places this conductor in a 0 state. Reopening of switch 68*b* returns a 1 state to conductor 38.

The upper end of coil 70*a* in FIG. 2 is grounded, and the lower end thereof in the figure is connected to conductor 30.

As will become apparent, on the occurrence of an incoming telephone call on conductors 20, 22 and with sensing by sensor 66 of the attendant ringing voltage, a 1 state is applied to conductor 30 which energizes coil 70*a*, and causes closure of switches 70*b*, 70*c*. Such action is referred to herein as line-seizure, through which a conductive connection is established between conductors 20, 22 and conductors 24, 26, respectively, through coil 68*a*. The unseen right ends of conductors 24, 26 in FIGS. 1 and 2 terminate in a winding in a conventional telephone transformer located within block 14 in FIG. 1.

With closure of switches 70*b*, 70*c*, and as is well understood by those skilled in the art, DC current flows through coil 68*a*, energizing this coil, and causing closure of switch 68*b*. So long as coil 70*a* remains energized, and the calling party maintains his telephone set in a "off hook" condition, such DC current continues to flow in coil 68*a*, and switch 68*b* remains closed. When the calling party hangs up, or if coil 70*a* becomes deenergized, coil 68*a* becomes deenergized, with resultant opening of switch 68*b*. Such opening of switch 68*b* causes a state change from 0 to 1 on conductor 38, which state change is used, as will later be described, to indicate a condition which should immediately reset device 10 to a waiting condition, regardless of what stage it is then performing in a mode.

5. The Tape Drive Mechanism and Audio Circuitry—Block 14

Figure 3:
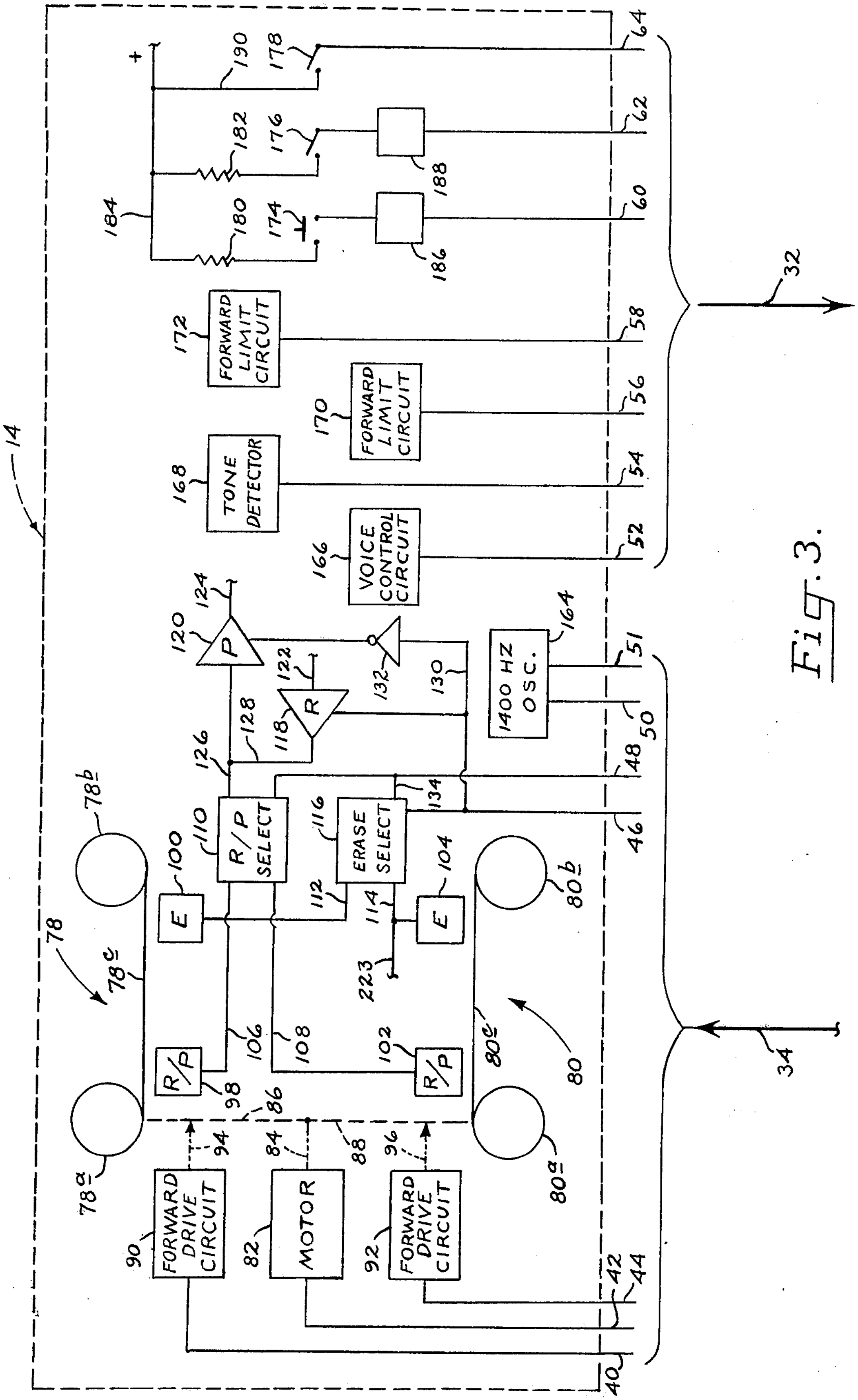
FIG. 3 is a combined block and circuit diagram illustrating details of the block in FIG. 1 labeled "Tape Drive Mechanism and Audio Circuitry."

Considering the contents of block 14, and referring to FIG. 3, included within this block are two conventional magnetic recording tape decks shown generally at 78, 80. Deck 78 constitutes an announcement deck herein, and is represented as including a pair of reels 78*a*, 78*b* between which extends a magnetic recording tape, or recording medium, 78*c*. Deck 80 is referred to as a message deck, and is represented by a pair of reels 80*a*, 80*b* between which extends a magnetic tape 80*c*. Tape 78*a* is used to record and play out announcements. Tape 80*c* is used to record and play out messages.

It should be understood that while a reel-to-reel arrangement has been shown in FIG. 3 as representative of decks 78, 80, this is for illustration purposes only. In other words, any suitable recording arrangement may be used.

Provided for reversibly driving the tapes in decks 78, 80 is an electric motor represented by block 82. Forward drive connections produceable between motor 82 and decks 78, 80 are represented by dashed lines 84, 86, 88. These drive connections are conventional in construction, and thus are not shown in detail. In general terms, and as will be well understood by those skilled in the art, such connections are made selectively so as to operate one or the other of the two decks in a forward direction.

Previously mentioned conductor 42 connects with the usual start-up circuitry provided for motor 82. With a 0 state on conductor 42, motor 82 is off. With a 1 state on this conductor, the motor runs.

Shown in block form at 90, 92 are two forward drive circuits which are associated with decks 78, 80, respectively. Drive circuits 90, 92 are for effecting forward drive connections between motor 82 and decks 78, 80, respectively. Dashed arrows 94, 96 indicate this. Conductors 40, 44 are connected to circuits 90, 92, respectively. With a 0 state present on conductor 40, no forward drive connection exists between motor 82 and deck 78. However, on a 1 state being applied to conductor 40, circuit 90 establishes such a connection. The same situation, resulting from like state changes on conductor 44, holds with respect to the operation of circuit 92 in establishing or breaking a forward drive connection between motor 82 and deck 80.

Associated with tape 78*c* are the usual recording/-playback head 98, and erase head 100. Head 98 is represented by a block marked "R/P," and head 100 is represented by a block marked E. Similarly, associated with tape 80*c* are a recording/playback head 102, and an erase head 104. Heads 102, 104 are substantially the same in construction as heads 98, 100, respectively. All of these heads are conventional.

Heads 98, 102 are connected via conductors 106, 108, respectively, to a block 110 marked "R/P Select," the function of which block will be explained shortly. Heads 100, 104 are connected via conductors 112, 114, respectively, to a block 116 marked "Erase Select," whose function will also be described shortly.

Shown by triangles 118, 120 in FIG. 3 are two electronic audio amplifiers which are used for amplifying electrical audio signals which are transmitted to and from tapes 78*c*, 80*c*. Amplifier 118, marked R, is used for amplifying signals sent for recording on these tapes. Amplifier 120, marked P, is used for transmitting played-out signals which have been recorded on these two tapes. Amplifiers 118, 120 are conventional, and are of the type which may be selectively enabled or disabled to transmit information between their respective inputs and outputs. Both of these amplifiers have substantially the same construction.

The input of amplifier 118 and the output of amplifier 120 are suitably connected through conductors 122, 124, respectively, to the transformer previously mentioned. A conductor 126 connects the input of amplifier 120 with block 110, and a conductor 128, along with conductor 126, similarly connects the output of amplifier 118 and block 110. The enable/disable terminals of amplifiers 118, 120 are connected to a conductor 130 which is connected to previously mentioned conductor 46. The enable/disable terminal of amplifier 118 is connected directly to conductor 130, and the corresponding terminal of amplifier 120 is connected to conductor 130 through a conventional inverter 132.

Completing a description of the connections provided for blocks 110, 116, conductor 46 connects with block 116, and conductor 48 connects with both of these blocks. The connection between conductor 48 and block 110 is direct, and that between conductor 48 and block 116 is through a conductor 134.

In general terms, circuitry within block 110 (which circuitry will shortly be discussed) determines which of the two recording/playback heads is coupled to conductor 126. Which one of the two possible connections exists at any given time depends on the voltage state present on conductor 48. With a 0 state on this conductor, head 102 is coupled to conductor 126. With a 1 state on the conductor, head 98 is coupled to conductor 126.

The circuitry within block 116 determines which of the two erase heads may be operated at any given time, and also, whether such head is in fact operated. The selection of which erase head may operate is determined by the voltage state on conductor 134—a 0 state on this conductor selecting head 104, and a 1 state selecting head 100. Whether the selected erase head operates is determined by the voltage state on conductor 46—a 0 state on this conductor disabling the selected head, and a 1 state operating the head.

With respect to the enabling and disabling of amplifiers 118, 120, a 1 state on the enable/disable terminal enables an amplifier, and a 0 state disables the amplifier. It will be apparent that with the connections described above (shown in FIG. 3), whenever amplifier 118 is enabled, amplifier 120 is disabled, and vice versa.

Figure 4:
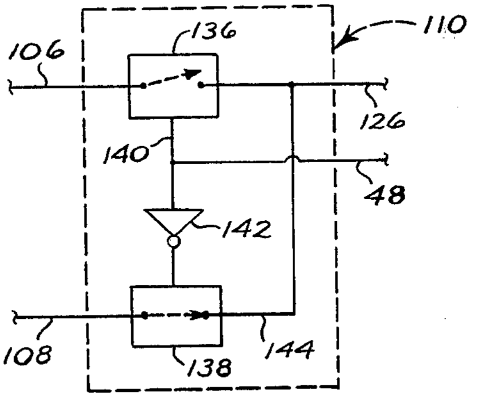
FIGS. 4 and 5 illustrate, respectively, the details of the blocks in FIG. 3 labeled "R/P Select" and "Erase Select."
Figure 5:
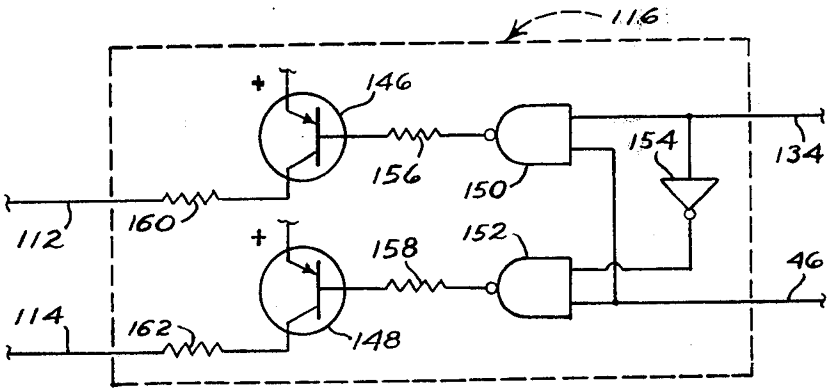

Turning for a moment to FIGS. 4 and 5, these two figures illustrate the contents of blocks 110, 116, respectively.

Considering first FIG. 4, included within block 110 are two conventional integrated-circuit-type analog switches 136, 138. Switch 136 includes the usual bidirectional input/output terminals which are connected as shown to previously mentioned conductors 106, 126. The switch further includes the usual control terminal which is connected via a conductor 140 to the input of an inverter 142. The output of inverter 142 is connected to the control terminal of switch 138. Conductor 48 connects with conductor 140. The input/output terminals of switch 138 are connected as shown to conductor 108, and via a conductor 144 to conductor 126.

A 0 state on the control terminal of a switch opens the switch, and a 1 state on this terminal closes the switch. With a switch closed, audio electrical signals are transmittable through it. With the control terminals of switches 136, 138 connected as shown, it will be obvious that only one of these switches may be open at any given time.

While various types of commercially available analog switches may be used, one type which has been found to be satisfactory is of the type included in an integrated circuit package made by Motorola, identified as device No. MC14016.

Referring to FIG. 5, included within block 116 are two PNP transistors 146, 148, two conventional two-input NAND gates 150, 152, and an inverter 154. The upper input of gate 150 is connected directly to previously mentioned conductor 134. Also connected to conductor 134 is the input of inverter 154, the output of which is connected to the upper input of gate 152. The lower inputs of gates 150, 152 are connected to conductor 46.

The outputs of gates 150, 152 connect through resistors 156, 158, respectively, to the bases of transistors 146, 148, respectively. The emitters of transistors 146, 148 are each connected to a suitable source of positive voltage, and the collectors connect through resistors 160, 162, respectively, to previously mentioned conductors 112, 114, respectively.

So long as a 0 state exists on conductor 46, gates 150, 152 place 1 states on their outputs. such is true regardless of what voltage state exists on conductor 134. And, under such circumstances, transistors 146, 148 are held in nonconducting states. As a consequence, and referring back to FIG. 3 along with FIG. 5, erase heads 100, 104 are held in disabled conditions, inasmuch as the collectors of the transistors place 0 states on conductors 112, 114. With a 1 state on conductor 46, then, depending upon the particular state existing on conductor 134, one or the other of transistors 146, 148 will be in a conducting state, and one or the other of the two erase heads will be operating. For example, and assuming that a 1 state exists on conductor 46, with a 0 state on conductor 134, the outputs of gates 150, 152 are in 1 and 0 states respectively. Hence, transistor 146 is nonconductive, whereas transistor 48 conducts and energizes erase head 104. The reverse situation is true with a 1 state rather than a 0 state present on conductor 134.

Thus, it will be seen that the voltage state present on conductor 46 operates or disables the erase heads, while the voltage state on conductor 134 selects which of the two erase heads may operate at any given time.

Returning again to FIG. 3, also included within block 14, and shown in block from therein, are a 1400 Hz. oscillator 164, a voice control circuit 166, a tone detector 168, and a pair of forward limit circuits 170, 172.

Oscillator 164, circuit 166, and detector 168 are all of conventional construction, and are each suitably electrically coupled to the transformer mentioned earlier. Oscillator 164 is turned on and off in accordance with the voltage states on conductors 50, 51 to which the oscillator is connected. With a 1 state on either conductor, the oscillator is turned on. Otherwise, it is off.

Tone detector 168 is a tuned detector, tuned to the same frequency as oscillator 164. The detector, in essence, and for a reason which will be described later, functions to monitor playing of announcement tape **78*c*. The tone detector is connected to conductor 54 on which it places a 1 state when, with playing of tape 78*c*,** it detects playing of the 1400 Hz. tone at the end of the announcement (the origin of which tone will be explained). At all other times, conductor 54 is in a 0 state.

Voice control circuit 166 is of a type which monitors the talking of a calling party—normally maintaining a 0 state on conductor 52 to which it is connected during such talking, but placing a 1 state on this conductor after a predetermined interval of nontalking in the telephone line.

The two forward limit circuits, 170, 172 are associated with tape decks 78, 80, respectively. Circuits 170, 172 are connected to conductors 56, 58, respectively, on which conductors they normally place 0 states. These two circuits monitor the forward-direction limit of travel in tapes 78*c*, 80*c*, producing a 1 state on the appropriate one of conductors 56, 58 on the associated tape reaching its forward limit of travel.

Completing a description of what is shown in FIG. 3, indicated at 174, 176, 178 are a hand-set pushbutton switch, a console switch, and a main power switch, respectively. Push-button switch 174 is suitably mounted on the hand-set in the subscriber's telephone set. Console switch 176 is suitably mounted on whatever housing is provided for answering device 10. Main power switch 178 is also mounted on the device housing.

The left sides of switches 174, 176 are connected through resistors 180, 182, respectively, to a positive voltage supply conductor 184 which is connected to a suitable supply of positive voltage. The right sides of switches 174, 176 are connected to the inputs of switch bounce elimination circuits 186, 188, respectively, the outputs of which are connected to conductors 60, 62, respectively. Circuits 186, 188 are substantially the same in construction, and are conventional—each comprising, basically, a mono-stable-type multivibrator whose output voltage state is under the positive control at all times of the input voltage state.

Through conventional means not shown in the drawings, the inputs of circuits 186, 188 are normally held in 0 states. Under such circumstances, the outputs are in 0 states. With closure of switch 174, a 1 state is placed on the input of circuit 186, whereupon the output of this circuit immediately switches to and remains in a 1 state so long as switch 174 remains closed. With opening of switch 174, circuit 186 maintains a 1 state on its output for a predetermined time interval after opening of the switch. The exact time interval used is not critical, but preferably should be relatively short. The particular time interval selected herein is several milliseconds. A similar operation takes place in circuit 188 with respect to closing and reopening of switch 176.

The left side of switch 178 is connected to conductor 184 through a conductor 190. The right side of the switch is connected to conductor 64.

6. The Programmed Electronic Sequence Control Circuitry—Block 16

A. Generally

Turning now to FIG. 6, this illustrates in block form the contents of the control circuitry contained within block 16. Considering the main components of this circuitry, included are a mode selector switch 192, a mode selection encoder 194, a master program memory 196, and a stage selector 198. Also includable as main components of circuitry 16 are reset circuitry, or circuit, 200, stage logic circuitry, or circuit, 202, a time counter 204, time logic circuitry, or circuit, 206, and a multi-input monostable multivibrator 208. With the exception of selector switch 192, all of these components are entirely electronic.

B. Switch 192

Mode selector switch 192 is a rotary, six-position, manual switch suitably mounted on the housing in device 10. As can be seen in FIG. 6, switch 192 includes two sets of six contacts each, one of these sets being designated 192*a*$_1$—192*f*$_1$, inclusive, and the other being designated 192*a*$_2$—192*f*$_2$, inclusive. Provided in the switch for selectively engaging contacts 192*a*$_1$—192*f*$_1$ is a movable wiper 191. Similarly, provided for so engaging the contacts in the other set is a movable wiper 193. Wipers 191, 193 are ganged together for simultaneous movement in such a manner that the wipers always engage corresponding contacts in the two sets of contacts. In other words, when wiper 191 engages contact 192*a*$_1$, wiper 193 engages contact 192*a*$_2$. When wiper 191 engages contact 192*b*$_1$, wiper 193 engages contact 192*b*$_2$; and so on. In FIG. 6, wipers 191, 193 are shown engaging contacts 192*c*$_1$, 192*c*$_2$, respectively.

Contacts 192*a*$_1$—192*f*$_1$ are all grounded. Contacts 192*a*$_2$, 192*b*$_2$, 192*d*$_2$, 192*e*$_2$, 192*f*$_2$ are connected to conductors 210, 212, 214, 216, 218, respectively. Each of these five conductors is biased normally to a 1 state through the five individual unnumbered resistors which respectively connect these conductors to a conductor 220 which, with device 10 turned on, is coupled to a suitable source of positive voltage. Contact 192*c*$_2$ is unconnected to anything external to switch 192.

Wiper 191 is connected to a conductor 222 which is normally biased to a 1 state through a resistor 224 that is coupled to the same source of positive voltage mentioned above. Conductor 222, in addition, is connected to the input of a conventional electronic differentiator shown in block form at 226. Wiper 193 is grounded.

A conductor 219 connects conductor 218 with the input of an inverter 221, whose output is connected to a conductor 223. Conductor 223 connects, for a purpose which will be described later, with previously mentioned conductor 114 (see FIG. 3).

Switch 192 functions to select an operating mode for device 10. As has been mentioned earlier, six different operating modes are contemplated for the answering device. These modes are associated with different positions in switch 192 as follows: Announcement Record, associated with contacts 192*a*$_1$, 192*a*$_2$; Announcement Check, associated with contacts 192*b*$_1$, 192*b*$_2$; Answer Only, associated with contacts 192*c*$_1$, 192*c*$_2$; Answer/-Record, associated with contacts 192*d*$_1$, 192*d*$_2$; Playback, associated with contacts 192*e*$_1$, 192*e*$_2$; and Erase, associated with contacts 192*f*$_1$, 192*f*$_2$.

It will be noted that while resistor 224 tends to bias conductor 222 to a 1 state, this conductor is held in a 0 state whenever wiper 191 engages a contact in switch 192. Each time that the switch is adjusted to change the positions of the wipers, and with movement of wiper 191 off a contact toward another contact, a positive voltage pulse occurs on conductor 222. More specifically, prior to movement of wiper 191, conductor 222 is in a 0 state. With disengagement of the wiper and a contact, conductor 222 switches to a 1 state, in which it remains until the wiper engages the next adjacent contact in the direction in which it is moved. On the latter occurring, conductor 222 is returned to a 0 state. With the production of such a voltage pulse, differentiator 226 produces on an output conductor 228, a pair of voltage spikes—the first one being a positive voltage spike and corresponding to the leading edge of the pulse, and the later one being a negative spike and corresponding to the pulse's trailing edge. As will become apparent, it is the positive voltage spike which has significance in the operation of device 10.

Contacts 192$a_2$, 192$b_2$, 192$d_2$, 192$e_2$, 192$f_2$, and the five respective conductors connected to these contacts, in the absence of the contacts being engaged by wiper 193, are normally in 1 states. When a contact is engaged by wiper 193, it, and the conductor connected with it, are placed in a 0 state.

C. Encoder 194

Mode selection encoder 194 includes five inputs, 194*a*—194*e*, inclusive, and three outputs, 194*f*—194*h*, inclusive. Inputs 194*a*, 194*b*, 194*c*, 194*d*, 194*e* are connected to conductors 210, 212, 214, 216, 218, respectively; and outputs 194*f*, 194*g*, 194*h* are connected to conductors 230, 232, 234, respectively.

In general terms, encoder 194 responds to the voltage states existing at any given time on its five inputs to produce a particular electrical signal condition of voltage states on its three outputs, which signal condition instructs memory 196 with respect to which mode of operation has been selected for the answering device. Encoder 194 and switch 192 together constitute a mode selector herein.

Figure 7:
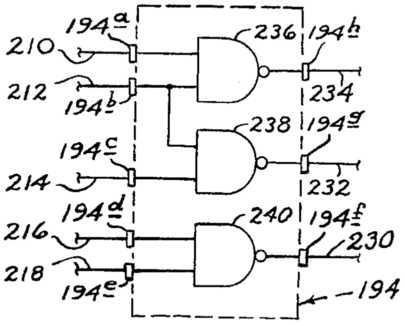
FIG. 7 shows circuit details of the block in FIG. 6 labeled "Mode Selection Encoder."

FIG. 7 in the drawings illustrates details of construction of the encoder, and turning for a moment to this figure, it will be seen that the encoder includes three two-input NAND gates 236, 238, 240. The upper input of gate 236 connects with input 194*a*, and the lower input of this gate connects both with input 194*b* and with the upper input of gate 238. The lower input of gate 238 connects with input 194*c*. Inputs 194*d*, 194*e* connect with the upper and lower inputs, respectively, of gate 240. The outputs of gates 236, 238, 240 are connected with encoder outputs 194*h*, 194*g*, 194*f*, respectively.

Set forth below in Table I is a voltage state table for encoder 194 which table, for each of the six operating modes of device 10, completely defines what will be the output voltage states on terminals 194*f*, 194*g*, 194*h* for the several different possible input voltage state conditions. A review of this table will show the different input voltage state conditions produceable through operation of switch 192. The different output signal conditions mentioned earlier, which indicate the different selective modes, are reflected in the output voltage state conditions. These output voltage state conditions are different in each case, except regarding the Playback and Erase modes, wherein the conditions are identical. The reason for such identity will become apparent later.

TABLE I

Mode Selection Encoder Table

| Mode | Inputs a | b | c | d | e | Outputs f | g | h |
|---|---|---|---|---|---|---|---|---|
| ANNC. REC | 0 | 1 | 1 | 1 | 1 | 0 | 0 | 1 |
| ANNC. CK | 1 | 0 | 1 | 1 | 1 | 0 | 1 | 1 |
| ANSWER ONLY | 1 | 1 | 1 | 1 | 1 | 0 | 0 | 0 |
| ANSWER/RECORD | 1 | 1 | 0 | 1 | 1 | 0 | 1 | 0 |
| PLAYBACK | 1 | 1 | 1 | 0 | 1 | 1 | 0 | 0 |
| ERASE | 1 | 1 | 1 | 1 | 0 | 1 | 0 | 0 |

D. Memory 196

Returning to FIG. 6, memory 196 herein is what is referred to by those skilled in the art as an electronic "read-only" memory—a term indicating that it is used in such a manner that it stores a not-to-be-changed program, whereby certain predetermined patterns of input voltage states produce certain predetermined related voltage output states that may be used for control purposes (as will be explained). Memory 196 constitutes an electronic performance-director according to the invention. Answering device 10 herein uses an integrated circuit memory made by National Semiconductors, Inc., and designated by the device number MM5203Q. This particular device is provided with eight inputs, or input means, and eight outputs, or output means. With respect to the inputs, the manufacturer designates these inputs by the letters A-H, inclusive. Accordingly, memory 196 is shown herein as including these eight inputs which are designated 196*a*—196*h*, inclusive—the lower case letters in these designations corresponding to the manufacturer's capital letter designations. Regarding the outputs in the specific device mentioned, the manufacturer identifies these outputs by the designations Bit 1—Bit 8, inclusive. Exactly the same designations are used herein.

As can be seen in FIG. 6, inputs 196*a*, 196*b*, 196*c* are connected to conductors 242, 244, 246, respectively. Inputs 196*d*, 196*e*, 196*f* are connected to conductors 234, 232, 230, respectively. Inputs 196*g*, 196*h* are grounded. Outputs Bit 1, Bit 2, Bit 3, Bit 4, Bit 5 are connected to conductors 30, 40, 44, 50, 42, respectively. The Bit 6 output is connected to a conductor 248. Conductors 46, 48 connect with outputs Bit 7, Bit 8, respectively.

According to the invention, memory 196 is programmed to perform in accordance with the various input and output voltage state conditions set forth in Table II below in the six different operating modes of device 10. In other words, Table II illustrates what voltage state output conditions will exist on the outputs of the memory for each of the several different input voltage state conditions on its inputs set forth in the table. The way in which the device mentioned above that is used for memory 196 may be set up internally to perform as defined by Table II is a matter which is well understood by those skilled in the art, and is in fact thoroughly explained by literature supplied by the manufacturer.

TABLE II

Memory Table

| Mode | Inputs h | g | f | e | d | c | b | a | Outputs BIT 1 | BIT 2 | BIT 3 | BIT 4 | BIT 5 | BIT 6 | BIT 7 | BIT 8 |
|---|---|---|---|---|---|---|---|---|---|---|---|---|---|---|---|---|
| ANNC. REC | 0 | 0 | 0 | 0 | 1 | 0 | 0 | 0 | 0 | 0 | 0 | 0 | 1 | 0 | 0 | 0 |
| | 0 | 0 | 0 | 0 | 1 | 0 | 0 | 1 | 0 | 1 | 0 | 0 | 1 | 0 | 1 | 1 |
| | 0 | 0 | 0 | 0 | 1 | 0 | 1 | 0 | 0 | 0 | 0 | 0 | 1 | 1 | 0 | 0 |

TABLE II-continued

| Mode | Inputs | | | | | | | | Memory Table Outputs | | | | | | | |
|---|---|---|---|---|---|---|---|---|---|---|---|---|---|---|---|---|
| | h | g | f | e | d | c | b | a | BIT 1 | BIT 2 | BIT 3 | BIT 4 | BIT 5 | BIT 6 | BIT 7 | BIT 8 |
| ANNC. CK | 0 | 0 | 0 | 1 | 1 | 0 | 0 | 0 | 0 | 0 | 0 | 0 | 1 | 0 | 0 | 0 |
| | 0 | 0 | 0 | 1 | 1 | 0 | 0 | 1 | 0 | 1 | 0 | 0 | 1 | 0 | 0 | 1 |
| | 0 | 0 | 0 | 1 | 1 | 0 | 1 | 0 | 0 | 0 | 0 | 0 | 1 | 1 | 0 | 0 |
| ANSWER ONLY | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 1 | 1 | 0 | 0 | 0 | 1 | 0 | 0 | 1 |
| | 0 | 0 | 0 | 0 | 0 | 0 | 1 | 0 | 1 | 1 | 0 | 0 | 1 | 0 | 0 | 1 |
| | 0 | 0 | 0 | 0 | 0 | 0 | 1 | 1 | 0 | 0 | 0 | 0 | 1 | 1 | 0 | 0 |
| ANSWER/ RECORD | 0 | 0 | 0 | 1 | 0 | 0 | 0 | 0 | 0 | 0 | 0 | 0 | 0 | 0 | 0 | 0 |
| | 0 | 0 | 0 | 1 | 0 | 0 | 0 | 1 | 1 | 0 | 0 | 0 | 1 | 0 | 0 | 1 |
| | 0 | 0 | 0 | 1 | 0 | 0 | 1 | 0 | 1 | 1 | 0 | 0 | 1 | 0 | 0 | 1 |
| | 0 | 0 | 0 | 1 | 0 | 0 | 1 | 1 | 1 | 0 | 1 | 0 | 1 | 0 | 1 | 0 |
| | 0 | 0 | 0 | 1 | 0 | 1 | 0 | 0 | 1 | 0 | 1 | 1 | 1 | 0 | 1 | 0 |
| | 0 | 0 | 0 | 1 | 0 | 1 | 0 | 1 | 0 | 0 | 0 | 0 | 1 | 1 | 0 | 0 |
| PLAYBACK | 0 | 0 | 1 | 0 | 0 | 0 | 0 | 0 | 0 | 0 | 0 | 0 | 1 | 1 | 0 | 0 |
| ERASE | 0 | 0 | 1 | 0 | 0 | 0 | 0 | 0 | 0 | 0 | 0 | 0 | 1 | 1 | 0 | 0 |

Explaining briefly why, as is apparent in Table II, different numbers of input voltage state conditions are shown for the different operating modes, these reflect the situation that different modes have different numbers of operating stages within them. This matter will be gone into in greater detail later, but at this point it might be mentioned that the Announcement Record and Announcement Check modes each include three stages, the Answer Only mode four stages, the Answer/Record mode six stages, and the Playback and Erase modes one stage each.

E. Stage Selector 198

Returning again to FIG. 6, stage selector 198 comprises a conventional resettable binary digital counter, including a counting input **198*a*, a reset terminal 198*b* and three outputs 198*c*, 198*d*, 198*e*. The counting input is connected to a conductor 250, the reset terminal to a conductor 252, and outputs 198*c*, 198*d*, 198*e* to conductors 242, 244, 246.**

With a 1 state on terminal **198*b*, counter 198 is held in a reset, or "zero-count", condition, with all of its outputs held in 0 states. With a 0 state on terminal 198*b*, the counter counts up with the receipt of each state change from 0 to 1 on its counting input. Regardless of the count condition existing at any time in the counter, a state change from 0 to 1 on terminal 198*b*** resets the counter to a zero-count condition.

Table III below indicates the various output voltage states which exist on the outputs of the counter for different counts stored therein. For reasons which will become apparent shortly, counter 198 is permitted to reach only a count of five, whereupon it will always be reset to a zero-count condition.

TABLE III

Stage Selector (Counter) Table

| Count Number | Outputs e | d | c |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |

Generally describing the function performed by counter 198, the counter has particular importance with respect to those operating modes having multiple operating stages. During such an operating mode, progressive counting in the counter indicates progressive completion of the stages in the mode. Attendant voltage state changes on the outputs of the counter are supplied to a portion of the inputs in memory 196, so as to instruct the memory to direct the performance of equipment in the answering device so as to perform the next sequential stage in a mode. Resetting of the counter occurs, in general terms, under two circumstances. Either at the completion of all stages in a mode, or, on the occurrence of an event that takes place before the completion of all stages, which event ought to result in a return of all apparatus in device 10 to a condition anticipating the initial stage in the mode. As an illustration, should the selected mode be one which permits a calling party, once he has listened to an announcement, to record a message, and should the party hang up either during the announcement or immediately thereafter, then it is desirable to place the answering device immediately in a condition to respond to another incoming call, without requiring that apparatus in the device first be sequenced through the remaining operating stages in this mode. Immediate resetting of counter 198 accomplishes this.

F. Reset Circuitry 200

Still with reference to FIG. 6, reset circuit 200 includes five inputs and a single output. The five inputs are shown along the right side of the block representing the circuit, and progressing downwardly from the top through these inputs, the uppermost input is connected through conductor 248 to the Bit 6 output of memory 196, the next input is connected through a conductor 258 to conductor 30, and the lower three inputs are connected, in order, to conductors 38, 64, 228, respectively. The output of the reset circuit, shown at the left side of the block representing the circuit, is connected to conductor 252.

In general terms, circuit 200 functions to determine under what circumstances a signal must be sent to reset counter 198 to a zero-count condition. One of these situations has already been described briefly above—namely, the situation in the Answer/Record mode of a calling party prematurely hanging up.

Figure 8:
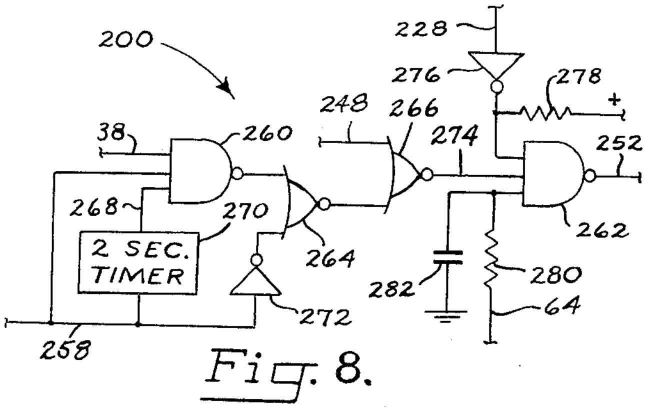
FIG. 8 shows circuit details of the block in FIG. 6 labeled "Reset Circuitry."

FIG. 8 in the drawings shows details of the internal construction of the reset circuit. Referring to this figure, included within circuit 200 are a plurality of gates including two three-input NAND gates 260, 262, and two two-input NOR gates 264, 266. The upper two inputs of gate 260 are connected as shown to conductors 38, 258. The lower input of this gate is connected through a conductor 268 to the output of a two-second timer 270, whose input is connected to conductor 258. Conductor 258 also connects with the input of an inverter 272 whose output connects with the lower input of gate 264. The upper input of gate 264 and the output of gate 260 are directly interconnected. Gate 266 has its upper input connected to conductor 254, and its lower input connected directly to the output of gate 264. A conductor 274 interconnects the output of gate 266 and the middle input of gate 262. The upper input of gate 262 is connected to the output of an inverter 276 whose input connects with conductor 228. A resistor 278 normally biases the upper input of gate 262 to a 1 state. The lower input of gate 262 connects through a resistor 280 to conductor 64, and to ground through a capacitor 282. The output of gate 262 acts as the output of circuit 200, and is connected to conductor 252.

With a 0 on conductor 258, timer 270 places a 1 on the lower input of gate 260. When the state on conductor 258 changes from 0 to 1, timer 270 places a 0 on the lower input of this gate—which state remains for an interval of two seconds. Thereafter, the lower input of the gate returns to a 1 state.

Other operations within the reset circuit will be described in detail as part of the overall operational description of device 10, which description appears later.

G. Logic Circuitry 202

Returning once again to FIG. 6, stage logic circuit 202 includes five inputs, designated 202*a*—202*e*, inclusive, and three outputs designated 202*f*—202*h*, inclusive. Inputs 202*a*, 202*b*, 202*c*, 202*d*, 202*e* are coupled through conductors 284, 286, 288, 290, 292, respectively, to conductors 42, 50, 44, 40, 30, respectively. Outputs 202*f*, 202*g*, 202*h* are connected to conductors 294, 296, 298, respectively.

Figure 9:
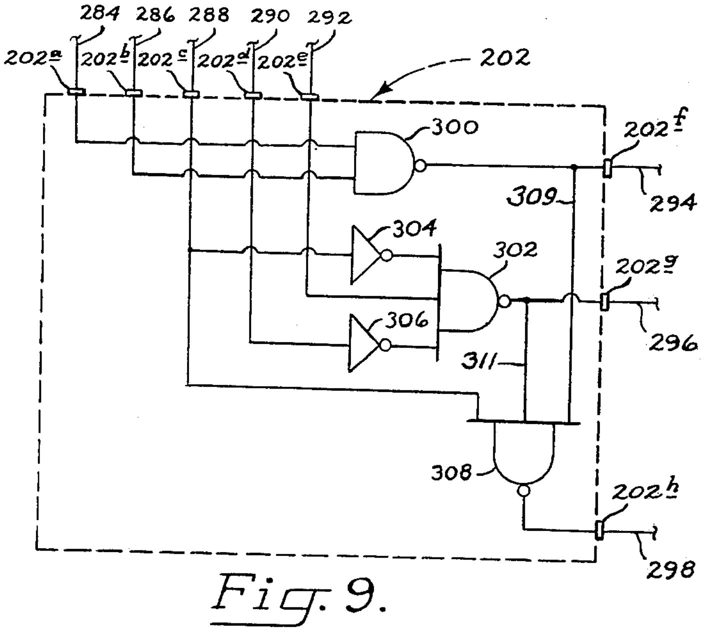
FIG. 9 shows details of the block in FIG. 6 labeled "Stage Logic Circuitry."

Details of the internal construction of circuit 202 are shown in FIG. 9. Considering this figure, what is seen to be included are a two-input NAND gate 300, two three-input NAND gates 302, 308, and two inverters 304, 306.

The upper and lower inputs of gate 300 are connected to inputs 202*a*, 202*b*, respectively, and the output of this gate is connected to output 202*f*. Input 202*c* connects through inverter 304 to the upper input of gate 302, and connects the left input of gate 308. Input 202*d* connects with the input of inverter 306, the output of which is connected to the lower input of gate 302. The middle input of gate 302 connects directly with input 202*e*, and the output of this gate connects with output 202*g*. Conductors 309, 311 connect the outputs of gates 300, 302, respectively, to the right and middle inputs, respectively, of gate 308. The output of gate 308 connects with circuit output 202*h*.

Set forth below in Table IV are the three voltage state input conditions for circuit 202 which result in 0 states being applied, individually, to the different outputs in the circuit, it will be apparent from FIG. 6 that the five inputs in circuit 202 are connected to the Bit 1—Bit 5 outputs of memory 196. Hence, the different possible combinations of voltage conditions which may be applied to circuit 202 are indicated in Table II above. Under all input voltage conditions, other than the three shown in Table IV, all three of the outputs of circuit 202 are held in 1 states.

TABLE IV

Stage Logic Circuit Table (Partial)

| Inputs | | | | | Outputs | | |
|---|---|---|---|---|---|---|---|
| a | b | c | d | e | f | g | h |
| 1 | 1 | 1 | 0 | 1 | 0 | 1 | 1 |
| 1 | 0 | 0 | 0 | 1 | 1 | 0 | 1 |
| 1 | 0 | 1 | 0 | 1 | 1 | 1 | 0 |

With further reference to Table II, and comparing Tables II and IV, it will be apparent that the input voltage condition producing a 0 state on output 202*f* occurs only in the fifth stage of the Answer/Record mode; the input voltage condition producing a 0 state on output 202*g* occurs only in the second stages of the Answer Only and Answer/Record modes; and, the input voltage condition producing a 0 on output 202*h* occurs only in the fourth stage of the Answer/Record mode.

H. Time Counter 204

Once again referring particularly to FIG. 6, time counter 204 is a conventional resettable binary digital counter, including a counting input 204*a*, a reset terminal 204*b*, and four outputs 204*c*, 204*d*, 204*e*, 204*f*. The counting input is connected to the output of a conventional 60 Hz. clock 310. The reset terminal is connected to the output of a two-input NAND gate 312. Outputs 204*c*, 204*d*, 204*e*, 204*f* are connected to the inputs of inverters 314, 316, 318, 320, respectively.

With a 1 state present on reset terminal 204*b*, counter 204 is held in a zero-count condition, with 0 states then existing on all four of its outputs. With a 0 state existing on the reset terminal, the counter is enabled to count pulses supplied by clock 310. In particular, the counter counts on each voltage state change from 0 to 1 on input 204*a*. The particular four outputs of counter 204 which have been selected, and which are used in circuitry 16, are such that: on the counter reaching the count of 60 (corresponding to a one-second time interval) output 204*c* is placed in a 1 state—all other outputs then being in 0 states; on the counter reaching the count of 120 (corresponding to a two-second time interval) output 204*d* is placed in a 1 state—all other outputs then being in 0 states; and, on the counter reaching the count of 720 (corresponding to a twelve-second time interval) outputs 204*e*, 204*f* are placed simultaneously in 1 states—the two other outputs then being in 0 states.

The provision of a counter such as counter 204, connected to supply output voltage conditions such as those just described, is well within the capability of those skilled in the art. Hence, no details are given with respect to the internal construction of the counter.

I. Time Logic Circuitry 206

Time logic circuit 206 includes seven inputs designated 206*a*—206*g*, inclusive, and a single output designated 206*h*. Inputs 206*a*, 206*b*, 206*c* are connected to conductors 294, 296, 298, respectively. Inputs 206*d*, 206*e*, 206*f*, 206*g* are connected to the outputs of inverters 314, 316, 318, 320, respectively. Output 206*h* is connected to a conductor 322.

FIG. 10 in the drawings illustrates details of construction of circuit 206. Included within this circuit are two two-input NOR gates 324, 326, a three-input NOR gate 328, and a three-input OR gate 330.

Inputs 206*a*, 206*b*, 206*c* are connected directly to the lower inputs of gates 324, 326, 328, respectively. Inputs 206*d*, 206*e* are connected to the upper inputs of gates 324, 326, respectively. Input 206*f* is connected to the middle input of gate 328, and input 206*g* is connected to the upper input of this gate. The outputs of gates 324, 326, 328 are each connected to a different one of the three inputs of gate 330. The output of gate 330 is connected to circuit output 206*h*.

Table V below is a partial voltage state truth table for circuit 206, illustrating in particular the three specific input voltage conditions which are capable of producing a 1 state on output 206*h*. Under all other input voltage conditions (i.e., other than the three set forth in Table V), output 206*h* is in a 0 state.

TABLE V

Time Logic Circuit Table (Partial)

| Inputs a | b | c | d | e | f | g | Output h |
|---|---|---|---|---|---|---|---|
| 0 | 1 | 1 | 0 | 1 | 1 | 1 | 1 |
| 1 | 0 | 1 | 1 | 0 | 1 | 1 | 1 |
| 1 | 1 | 0 | 1 | 1 | 0 | 0 | 1 |

The way in which circuit 206 cooperates with circuit 202 and counter 204 will be explained more fully shortly.

J. Remaining Components Shown in FIG. 6

Completing now a description of what is shown in FIG. 6, and thus completing a description of the contents of answering device 10, multivibrator 208 is a conventional monostable, multi-input multivibrator capable of producing on conductor 252, which is connected to its single output terminal, a 100-millisecond positive voltage pulse each time that it is triggered by a state change from 0 to 1 on any one of its eight inputs. Details of construction of this multivibrator are not shown specifically inasmuch as such construction is entirely conventional.

Progressing to the right across the top of the multivibrator block shown at 208 in FIG. 6, where the eight inputs are represented, the first five of these inputs are connected respectively to conductors 36, 54, 56, 58, 62. The sixth input is connected to conductor 322, the seventh input to conductor 60, and the eighth and last input to a conductor 332 which is connected to the output of an inverter 334.

A conductor 336 connects conductor 60 with the input of an inverter 338 whose output is connected to the input of a monostable multivibrator 340. The output of multivibrator 340 connects with previously mentioned conductor 51, which is seen in FIG. 6 to be connected to the input of inverter 334.

The output of multivibrator 340 is normally 0. On the input of the multivibrator being switched from 0 to 1, the multivibrator produces a positive voltage pulse lasting herein about three seconds. In other words, the output of the multivibrator switches from 0 to 1, remains in a 1 state for about three seconds, and then returns to a 0 state.

The right input in FIG. 6 of gate 312 is connected to conductor 52, and the left input of this gate in the figure is connected to the output of an inverter 342 whose input is connected via a conductor 344 to conductor 250.

Circuits 202, 206, counter 204, multivibrator 208, and the means interconnecting their components, are referred to collectively herein as a status monitor. Conductors 250, 252 constitute outputs for this monitor.

The status monitor along with counter 198 constitutes staging means in device 10.

7. Operational Description

A. Initial Conditions

Considering the instant in time when switch 178 is closed to turn on answering device 10, certain initial conditions will then exist in the device regardless of the selected mode of operation. Closure of switch 178 will, of course, change the voltage state on conductor 64 (which conductor connects with reset circuit 200) from 0 to 1. The effect of this state change in the reset circuit will be explained shortly. Whether or not motor 82 turns on at this time is one condition which depends upon the selected mode of operation. This situation will be discussed specifically as each of the several modes are explained in full.

Referring to various components in block 14 (FIG. 3), 0 states will exist on conductors 40, 44, and tapes 78*c*, 80*c* will be stationary. Tape 78*c* will always be in its initial position on reels 78*a*, 78*b*. Tape 80*c* may be in such a position on its reels if it has no recorded messages. Else, it will be in an advanced position because of messages which have previously been recorded. Conductors 46, 48, 50, 51 will also be in 0 states. As a consequence, heads 102, 104 will be selected for coupling to conductor 126, but erase head 104 will be disabled by the 0 state existing on conductor 46. Further, playback amplifier 120 will be disabled and recording amplifier 122 enabled. Oscillator 164 will be off.

Further considering components within block 14, voice control circuit 166 will initially place a 1 state on conductor 52 (since it now detects no talking in the telephone line), and tone detector 168 and circuits 170, 172 will initially place 0 states on conductors 54, 56, 58, respectively. Also initially in 0 states will be conductors 60, 62.

Referring to the components within block 16 (FIG. 6) the input and output conditions of mode selection encoder 194 will be in accordance with Table I above. This, of course, will depend upon the particular selected operating mode. Such also is true respecting memory 196. In other words, the input and output conditions of the memory will depend upon the selected mode, and will be in accordance with the contents of Table II. A glance at Table II, however, will show that in all of the operating modes, the Bit 1, Bit 2, Bit 3, Bit 4, Bit 7, Bit 8, outputs will always initially be in 0 states.

In stage logic circuit 202, the three outputs thereof will always initially be in 1 states. Output 206*h* in time logic circuit 206 will always initially be in a 0 state.

Clock 310 will be operating, and counter 204 will be counting pulses supplied by the clock. However, operation of counter 204 at this time is not significant.

Looking for a moment at the components within block 12 (FIG. 2), until the arrival of an incoming telephone call, conductor 36 will be in a 0 state, and conductor 38 in a 1 state. Conductor 30 (which is connected to the Bit I output of memory 196) will initially be in a 0 state, and hence, Line Seizure relay 70 will be deenergized.

Considering initial conditions in the reset circuit, and looking at FIG. 8, with the initial conditions just mentioned present on the various conductors connecting with inputs in the reset circuit, the output of the reset circuit will initially place a 1 state on conductor 252. More specifically, with a 0 state present on conductor 258, the lower inputs of gates 260, 264 will be in 1 states, respectively. Also, a 0 state will be present on the middle input of gate 260. Conductor 38 places a 1 state initially on the upper input of gate 260. As a consequence of these conditions, the output of gate 260 is in a 1 state, and the output of gate 264 in a 0 state.

With respect to gate 266, the lower input of this gate is initially in a 0 state. The voltage state on the upper of the gate, however, will depend upon the selected mode of operation. In all but the Playback and Erase modes, this upper input will be in a 0 state, in the Playback and Erase modes, it will be in a 1 state. Assuming for the moment that the selected mode of operation is other than Playback or Erase, the output of gate 266, which connects with the middle input of gate 262, will be in a 1 state.

Resistor 278 normally biases the upper input of gate 262 into a 1 state.

On the lower input of gate 262, at the instant that switch 178 is closed, a 0 state exists. Resistor 280 and capacitor 282 act to retard the rise of voltage on the lower input when conductor 64 is placed (by closure of switch 178) in a 1 state. In particular, the resistor and capacitor are chosen to retard, by about 50-milliseconds, the time when a 1 state appears on the lower input of the gate after closure of switch 178. The reason for this retardation is to maintain a 1 state on conductor 252 (and hence to hold counter 198 in a reset condition) for a time interval sufficient to assure proper powering of all other elements and components in the answering device. At the end of the delay time mentioned, when all inputs of gate 262 are in 1 states, the output of the gate switches to a 0 state.

If either the Playback or the Erase mode is initially selected, with a 1 state then present on the upper input of gate 266, a 0 state will be present on the middle input of gate 262 locking the output of this gate in a 1 state, and hence locking counter 198 in a reset condition. The significance of this situation will be explained shortly.

Under all initial circumstances, on closure of switch 178, stage selector 198 will be in a reset condition, with 0 states existing on all three of its outputs. Whenever the initially selected mode is other than Playback or Erase, counter 198 will be enabled to count about 50-milliseconds after closure of switch 178. In the Playback and Erase modes, however, counter 178 is held reset and is not able to count.

Finally, conductor 250 will always initially be in a 0 state.

B. The Announcement Record Mode

The Announcement Record mode includes three operating stages. In the first stage, the answering device is in what might be thought of as a waiting condition, with motor 82 running, awaiting action by the subscriber to begin recording an announcement on tape **78*c*. In the second stage, recording of the announcement is accomplished, at the end of which a 1400 Hz. tone is recorded also on tape 78*c*, to indicate the end point of the announcement. In the third and final stage, the answering device is returned to its initial, waiting condition, and, through conventional means, tape 78*c* is automatically rewound to its starting position on reels 78*a*, 78*b*.**

To place device 10 in the Announcement Record mode, the mode selector switch is adjusted to place wipers 191, 193 on contacts 192$a_1$, 192$a_2$. Table I indicates the input voltage conditions then existing on the inputs of encoder 194. This Table also, of course, indicates the attendant voltage states which result on the outputs of the encoder. In particular, outputs **194*f*, 194*g*, 194*h*** are placed in 0, 0, and 1 states, respectively.

It might be noted at this point that each time that the selector switch is adjusted, differentiator 226 delivers to the reset circuit over conductor 228, a positive voltage (1 state) spike. This produces a momentary 1 state on conductor 252, which assures, redundantly, that counter 198 is reset.

These three voltage states, along with the output voltage states (all 0 ) present on the outputs of counter 198, are applied to the inputs of memory 196, resulting in an input voltage state condition as indicated in Table II. As a consequence, memory 196 places a 1 state on its Bit 5 output—all other outputs then being in 0 states. This 1 state is applied through conductor 42 to the starting circuitry for motor 82, and as a result, motor 82 turns on. Nothing occurs until operation by the subscriber of hand-set pushbutton switch 174.

With closure of switch 174 a 1 state is placed on the input of switch bounce elimination circuit 186 whereupon this circuit simultaneously places a 1 state on conductor 60. The switch bounce elimination circuit functions, at this time, to isolate conductor 60 from any mechanical switch-bounce effects which might attend closure of the mechanical contacts in switch 174. With switching of conductor 60 from 0 to 1, multivibrator 208 delivers a positive voltage pulse to conductor 250. In addition, the output of inverter 338 switches to a 0 state—which action has no further consequences.

Every time that multivibrator 208 delivers such a pulse, and under conditions where counter 204 is operating (which will be so long as a 1 remains on conductor 52), the counter is reset, and held reset throughout the duration of the pulse.

Assuming that the subscriber has waited at least 50 milliseconds (after turning on device 10) before operating switch 174, counter 178 will be in a condition to count pulses, and will respond to the positive-going or leading edge of the pulse thus delivered to conductor 250. In particular, it will count this pulse, and switch from a condition storing the count of "ZERO" to a count of "ONE". Obviously, this will change the input voltage conditions on the inputs of memory 196, specifically by placing a 1 state on input **196*a*. Referring again to Table II, this then results in memory 196 changing to a condition with its Bit 2, Bit 5, Bit 7, Bit 8** outputs all in 1 states, and the other inputs in 0 states.

With a 1 state remaining on the Bit 5 output, motor 82 continues running. Application of a 1 state to the Bit 2 output applies a 1 state to conductor 40, which then results in operation of forward drive circuit 90 to couple motor 82 to tape deck 78. Consequently, tape **78*c* begins running in a forward direction. Placement of 1 states on the Bit 7, Bit 8 outputs applies 1 states to conductors 46, 48. This action results in recording/playback head 98 and erase head 100 being selected for operation, and in operating of erase head 100. Thus, head 98 is coupled to conductor 126, and head 100 operates to erase tape 78*c* in advance of head 98. Further, placement of a 1 state on conductor 46 enables amplifier 118 and disables amplifier 120.**

Device 10 is now in a condition to begin recording an announcement. The subscriber's hand-set is coupled to the transformer mentioned earlier, and simply by speaking into the mouthpiece of the hand-set, the subscriber can record, through amplifier 118, whatever announcement he wishes on tape 78c. In device 10, switch 174 must be held closed throughout the time that the announcement is being recorded.

When the subscriber finishes recording the announcement, he releases and opens switch 174. A few milliseconds after opening of switch 174, circuit 186 returns a 0 state to conductor 60, which action has no effect as far as multivibrator 208 is concerned, but does have an effect in multivibrator 340. With respect to multivibrator 340, return of a 0 state to conductor 60 results in the input of this multivibrator switching from 0 to 1 whereupon the multivibrator simultaneously switches its output, and hence conductor 51 to a 1 state. Multivibrator 340 holds this output 1 state for about a three-second interval.

Placement of a 1 state on conductor 51 results in placement of a 0 state on conductor 332. This change on conductor 332, however, has no effect in multivibrator 208. Placement of the 1 state on conductor 51 turns on oscillator 1400, whereupon a three-second 1400 Hz. tone is recorded on tape 78c, to indicate the end point of the announcement which has just been recorded. At the end of the three-second interval mentioned, conductor 51 returns to a 0 state, turning off oscillator 164, and causing multivibrator 208 to place another positive voltage pulse on conductor 250. As a consequence, counter 198 switches to a count of "TWO."

Thus, the input voltage conditions on the inputs of memory 196 again change, as indicated by Table II, whereupon memory 196 places 1 states on its Bit 5, Bit 6 outputs, and 0 states on all other outputs. Motor 82 thus continues running, but no longer drives tape 78c in a forward direction. Conventional means, not shown herein, now couples the motor to deck 78 in such a manner as to rewind tape 78c to its starting position on reels 78a, 78b. A conventional rewind limit circuit determines when the tape has been properly rewound, at which time the motor is completely disconnected from the deck.

Placement of a 1 state on the Bit 6 output places a 1 state on conductor 254, which action results in operation of reset circuit 200 to place a 1 state on conductor 252. This 1 state resets counter 198 to a zero-count condition, whereupon answering device 10 is returned to the same conditions which it had during the initial stage of the Announcement Record mode.

C. The Announcement Check Mode

Three operating stages characterize the Announcement Check mode. In the first stage, device 10 is essentially in the same condition as it is in the first stage of the Announcement Record mode. During the second stage, the announcement which is recorded on tape 78c is played out locally so that the subscriber can check its content. And during the third stage, the answering device is returned to its waiting or initial condition.

To place device 10 in the Announcement Check mode, switch 192 is adjusted to place wipers 191, 193 in engagement with contacts 192$b_1$, 192$b_2$. Encoder 194 then places on its outputs 194f, 194g, 194h, a 0, 1, 1, respectively. These three voltage states, along with the 0 voltage states now present on the outputs of counter 198 are placed, as shown in Table II, on the inputs of memory 196. Memory 196 places a 1 state on its Bit 5 output, and 0 states on all of its other outputs. It will be recalled that this is the same output voltage condition existing during the first stage of the announcement record mode. Hence, motor 82 is running.

The subscriber then closes console switch 176, whereupon a 1 state is placed on conductor 62 which results in multivibrator 208 delivering a positive voltage pulse to the counting input of counter 198. Counter 198 switches to a count of "ONE," changing the input condition for memory 196 as indicated in Table II. With this change, the memory places 1 states on its Bit 2, Bit 5, Bit 8 outputs, and 0 states on its other five outputs. Motor 82 then drives tape 78c in a forward direction to begin playing out the recorded announcement. The application of a 1 state to the Bit 8 output results in heads 98, 100 being coupled to conductor 126. With a 0 state now on conductor 46, erase head 100 as disabled as is amplifier 118. Amplifier 120, however, is enabled. Accordingly, the announcement is played out through amplifier 120 to the hybrid transformer from which it is coupled into the earpiece in the hand-set.

At the end of the announcement, the 1400 Hz. tone previously recorded is played out, which tone is detected by tone detector 168. Such detection results in a 1 state being applied to conductor 154, which then causes multivibrator 208 to deliver another positive voltage pulse to the counting input of counter 198. Counter 198 then counts to a count of "TWO" and again changes the input voltage conditions for memory 196. The resultant output voltage conditions for the memory, shown in Table II, are identical to those which occur in the third stage of the Announcement Record mode. Hence, the same subsequent action occurs in device 10.

D. The Answer Only Mode

The Answer Only mode has four operating stages. In the first stage, device 10 simply awaits an incoming call. The second stage is initiated by an incoming call, and on the receipt of such a call, introduces a two-second time delay before permitting any further action in the answering device. This consciously added time delay is to permit "electrical settling" in the telephone line, so that any transient electrical conditions which result in the line as the result of answering the call are not mistakenly interpreted by device 10. For example, device 10 could interpret such conditions wrongly as hang-up by the calling party. During the third stage, the announcement on tape 78c is played out to the calling party. The fourth stage is initiated by playing out of the 1400 Hz. tone at the end of the announcement. In this final stage, the various components in device 10 are returned to the same conditions which they had at the beginning of the mode.

Answering device 10 is placed in the Answer Only mode by adjusting wipers 191, 193 to engage contacts 192$c_1$, 192$c_2$ in switch 192. This adjustment results in input and output voltage conditions for memory 196 as shown in Table II. It will be noted that in this first stage of the Answer Only mode, all outputs of the memory are in 0 states. Nothing further happens until receipt of an incoming call.

When a call is received over line 18, ring sensor 66 detects the ringing voltage attending the call, and places a 1 state on conductor 36. This 1 state is applied to multivibrator 208 which causes counter 198 to count up to a count of "ONE." As has been the case in the other two operating modes described, a change in the count condition of counter 198 changes the input voltage condition for memory 196, and hence the output voltage conditions of the memory. With counter 198 storing a count of "ONE," memory 196 places 1 stages on its Bit 1, Bit 5, Bit 8 outputs, and 0 states on its other outputs.

The 1 state applied to the Bit 1 output is applied via conductor 30 to Line Seizure coil 70*a*, and via conductors 32, 58 to reset circuit 200. Coil 70*a* energizes and closes switches 70*b*, 70*c*. This results in energizing of Calling Party Control coil 68*a*, with resultant closure of switch 68*b*, and placement of a 0 state on conductor 38. This 0 state is applied to reset circuit 200.

In the reset circuit, application of the 0 state via conductor 38 has no effect on the output condition of the reset circuit. Also, the 1 state supplied to the reset circuit via conductor 258 (from the Bit 1 output) does not affect the output condition of the circuit. However, this 1 stage triggers timer 270, whereupon the timer simultaneously switches its output (and hence the lower input of gate 260) from a 1 to a 0 state for a two-second time interval. This two-second interval relates to the time delay mentioned above in the general description of the second stage of this operating mode. Holding of a 0 state on the lower input of gate 260 during this interval prevents any change of condition in the telephone line (which might affect the continued energization of coil 68*a*) from being prematurely interpreted as hang-up by the calling party. Deenergizing of coil 68*a*, and resultant reopening of switch 68*b*, it will be noted, causes a state change on conductor 38 from 0 to 1 which state change, could effect a reset command out of the reset circuit if the lower two inputs of gate 260 were simultaneously in 1 states. It is desirable not to allow this to happen until at least two seconds after energizing of Line Seizure coil 70*a*. Timer 270, thus, accomplishes this purpose.

Comparing Tables II and IV, it will be observed that there now exists on the Bit 1—Bit 5 outputs in memory 196 the proper voltage states to cause stage logic circuit 202 to apply a 0 state to its output 202*g*. With this the case, appropriate input conditions exist on the inputs of time logic circuit 206 to permit this circuit to respond to counting by counter 204 up to a count of 120 (corresponding to a two-second time interval). Counter 204, of course, begins from a zero-count condition with the resetting of the counter which occurred simultaneous with the pulse from multivibrator 208 that stored a count of "ONE" in counter 198. On counter 204 reaching a count of 120, the voltage stages on inputs 206*d*, 206*e*, 206*f*, 206*g* in circuit 202 are 1, 0, 1, 1, respectively. These conditions, along with 1, 0, and 1 states simultaneously existing on inputs 206*a*, 206*b*, 206*c*, respectively, result in a 1 state being placed on output 206*h*.

Thus, a two-second time delay interval is introduced into the operation of device 10 after receipt of an incoming call and energizing of coil 70*a*. Energizing of coil 70*a* is employed in a conventional manner, not gone into detail herein, to effect "answering" of the incoming call.

At the end of the two-second interval, and on switching of output 206*h* from 0 to 1, multivibrator 208 causes counter 198 to switch to a count of "TWO." The output voltage conditions of the memory then change as indicated by Table II to a situation where outputs Bit 1, Bit 2, Bit 5, Bit 8 are in 1 states, and the other four outputs are in 0 states. The change of voltage state on the Bit 2 output applies a 1 state to conductor 40, whereupon motor 82 is connected to drive tape 78*c* in the forward direction. Recording/playback head 98 is coupled through conductor 126 to amplifier 120 which is enabled, and erase head 100 is disabled. Accordingly, the recorded announcement is played out to the calling party.

At the end of playing out of the announcement, the 1400 Hz. tone is detected by detector 168, and multivibrator 208 then switches counter 198 to a count of "THREE." This action then results in memory 196 having the same output voltage states which it had in the final stages of the first two-described operating modes. Hence, subsequent action in the answering device is the same.

In this operating mode, should the calling party hang up before the end of the announcement, and after the initial two-second delay interval, coil 68*a* deenergizes and opens switch 68*b* to return a 1 state to conductor 38. If this should occur, reset circuit 200 immediately applies a 1 state to the reset terminal in counter 198, immediately resetting this counter to a zero-count condition. All components in device 10 are then returned substantially instantaneously to the same conditions which they had during the first stage of the mode—awaiting an incoming call. An exception to this, of course, is that a certain time interval is required to effect rewinding of the announcement tape. However, it is significant that the remaining stages of the mode are not required to be completed. Thus, device 10 is enabled to receive another incoming call in short order.

E. The Answer/Record Mode

The Answer/Record mode is characterized by six operating stages, the first three of which are identical to the first three stages in the Answer Only mode. In the fourth stage of this mode the calling party is given an opportunity to record a message on tape 80*c*. In the fifth stage, which occurs after a sufficiently long gap in talking over the telephone line, a warning tone is sent over the line to indicate that disconnect is imminent. And in the final stage, the answering device is returned to its initial stage in the mode, awaiting an incoming call.

To place device 10 in the Answer/Record mode, switch 192 is adjusted to place wipers 191, 193 in contact with switch contact 192*$d_1$*, 192*$d_2$*. As has already been mentioned, the first three stages in the mode duplicate the first three stages in the Answer Only mode, and hence will not be rediscussed.

At the end of the third stage, tone detector 168 detects the 1400 Hz. tone on the announcement tape, and causes counter 198 to switch to a count of "THREE." This results in the output voltage condition for memory 196 shown in Table II, where the Bit 1, Bit 3, Bit 5, Bit 7 outputs are in 1 states, and the other four outputs are in 0 states. These output states results in motor 82 driving message tape 80*c* in a forward direction, in operation of erase head 104, and in coupling of record/-playback head 102 with the output of amplifier 118 which is enabled. In addition, the output voltage conditions now existing on the Bit 1—Bit 5 inputs of stage logic circuit 202 produce on outputs 202*f*, 202*g*, 202*h*, 1, 1, and 0 states, respectively (compare Tables II and IV). Thus, time logic circuit 206 is set up, so-to-speak, to "watch" for a count of 720 in counter 204. This count, it will be recalled, corresponds to a twelve-second time interval.

Voice control circuit 166 now plays a role. More specifically, this circuit monitors talking in the telephone line, and so long as normal talking continues (i.e., transmission of a message from the calling party), the voice control circuit alternates the voltage state on conductor 52 between 0 and 1. Experience has shown that normal speech is nearly always characterized by time gaps which are less than twelve seconds. Hence, the changing voltage states on conductor 52, which are applied to an input in gate 312 (see FIG. 6), cause periodic resetting of counter 204 before it can reach a count of 720. So long as counter 204 is prevented from reaching a count of 720, the status of the answering device remains unchanged, and the calling party is permitted to continue recording a message.

When, however, a twelve second time gap occurs in speech over the telephone line (usually indicating the completion of a message), counter 204, assuming that the calling party has not by then hung up, is permitted to reach a count of 720, whereupon output 206*h* is switched from 0 to 1. This effects switching of counter 198 to a count of "FOUR," whereupon the output voltage states for memory 196 are changed as indicated by Table II. In particular, the Bit 1, Bit 3, Bit 4, Bit 5, Bit 7 outputs are now in 1 states, and the other three outputs in 0 states. The only operational change which this effects in device 10 is that the input voltage states for stage logic circuit 202 now produce a 0 state on output 202*f*, and 1 states on outputs 202*g*, 202*h*. As a consequence, time logic circuit 206 is now set up to watch for a count of 60 (corresponding to a one-second time interval) in counter 204.

Also, placement of a 1 state on the Bit 4 output places a 1 state on conductor 50, which causes operation of oscillator 164. Oscillator 164 then plays out over the telephone line a warning tone indicating that disconnection of device 10 from the line is imminent.

On counter 204 reaching a count of 60, output 206*h* in circuit 206 switches to a 1 state, whereupon counter 198 switches to a count of "FIVE." On this taking place, the output voltage conditions of memory 196 are switched to the same conditions which they have had at the final stages of each of the three previously described operating modes. Thus, concluding operation in device 10 is the same as has been described earlier. Message tape 80*c* is not rewound at this time. Rather, this is simply stopped in place, whereby it is ready to record another message.

Just as in the case of the Answer Only mode, had the calling party hung up prior to completion of the twelve-second interval discussed in this mode, counter 198 would have been immediately reset to a zero-count condition, and device 10 returned to its waiting condition, without the necessity of having to complete any further stages in the mode.

F. The Playback Mode

As has been mentioned earlier, the Playback mode is a single-stage mode provided for the purpose of enabling the subscriber to play out, locally, any messages which have been recorded on tape 80*c*.

To place device 10 in the Playback mode, wipers 191, 193 in switch 192 are adjusted to positions engaging contacts 192*e*$_1$, 192*e*$_2$, respectively. The conditions then resulting at the inputs and outputs of encoder 194 and of memory 196 are shown in Tables I and II. With 1 states existing on the Bit 5 and Bit 6 outputs of the memory, motor 82 operates, and reset circuit 200 holds counter 198 in a reset condition. Heads 102, 104 are selected for coupling to conductor 126, and erase head 104 is disabled. Playback amplifier 120 is enabled.

Through conventional manual controls provided in device 10, the subscriber rewinds tape 80*c* to its starting position. With this tape rewound, the subscriber then operate either of switches 174, 176, whereupon tape 80*c* is driven forwardly to play out any messages on the tape.

G. The Erase Mode

Like the Playback mode, the Erase mode is also a single-stage mode. The purpose of this mode is to enable erasure of any messages which have accumulated on tape 80*c*.

In the Erase mode, wipers 191, 193 engage switch contacts 192*f*$_1$, 192*f*$_2$. Tables I and II show the resulting input and output voltage conditions for encoder 194 and memory 196. And, it will be observed that the output voltage states on the outputs of the memory are the same as existed on the Playback mode. Further, engagement of wiper 193 and contact 192*f*$_2$, places a 0 state on the input of inverter 221, which then places a 1 state on conductor 223. It will be recalled that conductor 223 connects with conductor 114, which connects with erase head 104.

Under all of these circumstances, motor 82 operates, counter 198 is held in a reset condition, and erase head 104 is operated. The subscriber again uses the manual controls, just mentioned, to cause rewinding of tape 80*c*. He then closes either of switches 174, 176, whereupon tape 80*c* runs forwardly, with erase head 104 now erasing any accummulated messages.

H. Final Matters

Considering, finally, the operations of forward limit circuits 170, 172, circuit 170, which monitors tape 78*c*, may be effective in the Announcement Record mode, the Announcement Check mode, the Answer Only mode, and the Answer/Record mode. Circuit 172, associated with tape 80*c*, may be effective in the Answer/Record, Playback, and Erase modes. The term "may" is used inasmuch as it will probably be rather infrequently that either of these circuits is called upon.

With respect to circuit 170, should tape 78*c* reach its forward travel limit during any of the four modes just mentioned, the circuit applies a 1 state to multivibrator 208 via conductor 56. The multivibrator then causes counter 198 to count up one count, whereupon the next stage in a mode is performed. In the cases of the Announcement Record, Announcement Check, and Answer Only modes, such action places device 10 in the final stage of the mode. In the case of the Answer/-Record mode, such action results in stopping and rewinding of the announcement tape, and placement of device 10 in the fourth operating stage of the mode—-with message tape 80*c* then running.

Should the message tape reach its forward travel limit, then circuit 172 places a 1 state on conductor 58, effecting action by multivibrator 208. In the Playback and Erase modes, action by the multivibrator has no effect on counter 198. In these two modes, circuitry (not shown herein) employs the 1 state applied to conductor 58 simply to stop the message tape. This circuitry forms no part of the present invention. In the Answer/Record mode, counter 198 counts up, and places device 10 in the fifth stage of the mode, described earlier.

8. Conclusion

It will thus be apparent that according to the present invention a telephone answering device is provided wherein the various operating stages in different operating modes are completely under the control of electronic control circuitry, which at all times determines precisely what operation should be performed in accordance both with the conditions of the various components in the answering device and with the conditions in the associated telephone line. At the heart of this control circuitry is program memory 196 which, on its input side, is supplied with two types of information—-one type indicating which particular mode of operation has been selected, and the other type indicating which stage in the mode should be performed. Interconnecting the telephone line interface components, and the other components of the answering device with memory 196 is the circuitry referred to earlier as staging means, which determines whether, in a multiple stage mode, the operation should be advanced sequentially from stage to stage, or whether a condition has arisen that should prevent continued sequencing, and should return all apparatus to initial conditions. All operations under the control of memory 196, of course, take place completely automatically.

With the use of the electronic circuitry described, complex mechanical relay circuitry, and its attendant problems, are avoided.

While a preferred embodiment of the invention has been described, it is appreciated that variations and modifications may be made without departing from the spirit of the invention.

It is claimed and desired to secure by Letters Patent:

1. In a telephone answering device including recording means, playback means, and line-coupling and interface means, constructed for operation of said several means in a plurality of different, individually selectable operating modes, each characterized by one or more operating stages, mode selector means for selecting an operating mode for said device and for producing a first electrical output signal condition indicative exclusively of the selected mode, electronic staging means operatively connected to said recording means, playback means, and line-coupling and interface means for sensing the respective operational statuses thereof, and for producing a second electrical output signal condition indicative of such statuses, and programmed electronic performance-directing means, including memory means, operatively connected to said recording, playback, and line-coupling and interface means, and responsive to said first and second output signal conditions for effecting operation of said several means as required at each stage in an operating mode.

2. The answering device of claim 1, wherein said memory means comprises a read-only memory having input means with first and second portions thereof operatively connected to said mode selector means and staging means, respectively, for receiving said first and second electrical output signal conditions produced thereby, and output means operatively connected to said recording, playback, and line-coupling and interface means for effecting the operations thereof, receipt of a specific electrical signal pattern at said input means producing instantaneously a related specific electrical signal pattern at said output means.

3. The answering device of claim 2 in which each multiple-stage mode is characterized by an initial stage which is to be followed, for completion of the entire mode, by a predetermined sequence of additional stages, and wherein said staging means includes an electronic status monitor which directly monitors the instantaneous statuses of said recording, playback, and line-coupling and interface means, said status monitor having a pair of outputs on one of which it produces electrical signal changes each of which indicates that the operating conditions of the recording, playback, and line-coupling and interface means should be advanced to perform the next sequential stage in a selected multiple-stage mode, and on the other of which it produces electrical signal changes each of which indicates that there should be a return to the initial stage of the mode, and said staging means further includes a stage selector operatively interconnecting said outputs of said status monitor and said other portion of said input means in said memory for generating from the electrical signal changes produced by the status monitor the appropriate electrical signal condition to be applied to said other portion of said input means.

4. The answering device of claim 3, wherein said stage selector comprises a resettable digital counter having a counting input operatively connected to said one output of said status monitor, a reset input operatively connected to said other output of said status monitor, and a plurality of outputs operatively connected to said second portion of said input means in said memory.

* * * * *